July 15, 1958  G. E. CHICOINE ET AL  2,842,876
PARKING LOT CONTROL SYSTEM
Filed Aug. 2, 1955  8 Sheets-Sheet 1

INVENTORS.
GORDON E. CHICOINE
HARVEY B. GUNN
BY  EUGENE T. MAHONEY
DALLAS B. JOHN

ATTORNEY

July 15, 1958 G. E. CHICOINE ET AL 2,842,876
PARKING LOT CONTROL SYSTEM
Filed Aug. 2, 1955 8 Sheets-Sheet 4

INVENTORS.
GORDON E. CHICOINE
HARVEY B. GUNN
BY EUGENE T. MAHONEY
DALLAS B. JOHN

Albert L. Jeffers
ATTORNEY

July 15, 1958     G. E. CHICOINE ET AL     2,842,876
PARKING LOT CONTROL SYSTEM Filed Aug. 2, 1955     8 Sheets-Sheet 5

INVENTORS.
GORDON E. CHICOINE
HARVEY B. GUNN
EUGENE T. MAHONEY
DALLAS B. JOHN

BY *Robert L. Jeffers*
ATTORNEY

July 15, 1958

G. E. CHICOINE ET AL

2,842,876

PARKING LOT CONTROL SYSTEM

Filed Aug. 2, 1955

INVENTORS.
GORDON E. CHICOINE
HARVEY B. GUNN
EUGENE T. MAHONEY
DALLAS B. JOHN

BY

Albert L. Jeffers

ATTORNEY

July 15, 1958  G. E. CHICOINE ET AL  2,842,876
PARKING LOT CONTROL SYSTEM
Filed Aug. 2, 1955  8 Sheets-Sheet 7

INVENTORS.
GORDON E. CHICOINE
HARVEY B. GUNN
EUGENE T. MAHONEY
DALLAS B. JOHN
BY
Albert L. Jeffers
ATTORNEY July 15, 1958  G. E. CHICOINE ET AL  2,842,876
PARKING LOT CONTROL SYSTEM
Filed Aug. 2, 1955  8 Sheets-Sheet 8

INVENTORS.
GORDON E. CHICOINE
HARVEY B. GUNN
EUGENE T. MAHONEY
DALLAS B. JOHN
BY
Albert L. Jeffers
ATTORNEY

United States Patent Office 2,842,876
Patented July 15, 1958

2,842,876

PARKING LOT CONTROL SYSTEM

Gordon E. Chicoine, Chicago, Harvey B. Gunn, Western Springs, Eugene T. Mahoney, Chicago, and Dallas B. John, Lombard, Ill., assignors to Johnson Fare Box Company, Chicago, Ill., a corporation of Delaware Application August 2, 1955, Serial No. 525,972

16 Claims. (Cl. 39—1)

This invention relates to a parking lot control system, and more particularly to an automatic parking lot system which does not require attendants to operate.

It is an object of the invention to provide means for positively controlling ingress and egress to a parking lot.

Another object of the invention is the provision of means for admitting persons having a currently valid key to the parking lot without leaving the automobile.

A further object of the invention resides in the provision of a parking lot control system that is strong, durable, completely safe with no hazards to automobiles or passengers, highly efficient in operation, simple in construction and design, capable of being readily manufactured at a comparatively low cost, and which is easy to use.

A still further object of the invention is the provision of a parking lot control system which will eliminate parking abuses at hospitals, factories and other organizations, and assure ample parking facilities at all times for authorized personnel entitled to parking privileges on the parking lot.

Another object of the invention is to provide a coded card key which will actuate the control mechanism and which may be coded for a month, a year, or for any length of time desired.

Yet another object of the invention is to provide electrical means which is responsive to the pressure of the tires of an automobile for closing the gate.

Another object of the invention is the provision of a dual control gate for both ingress and egress which may be used in a parking system adapted for operation by a small parking lot owner.

A still further object of the invention is the provision of a free entrance or free exit parking control system at the option of the parking lot owner.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Similar characters of reference are employed to designate similar or identical elements and portions throughout the specification and throughout the different views of the drawings.

Figure 1:
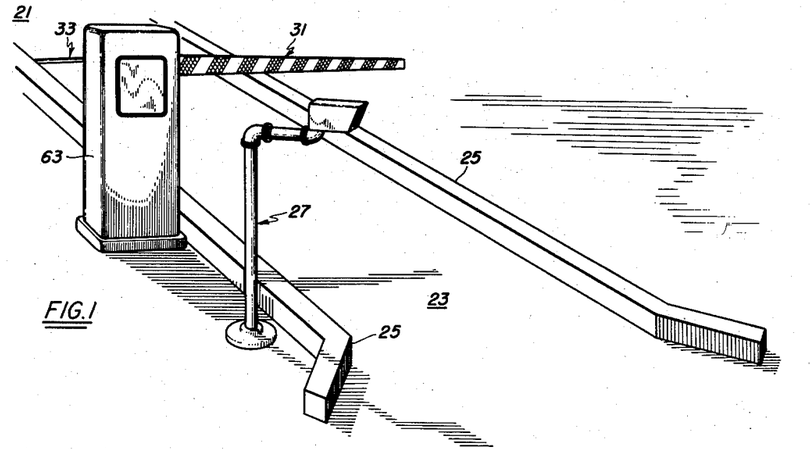
Figure 1 is a perspective view showing one side of the parking lot control system with the other side being of the same construction.

Referring particularly to Figure 1 the numeral 21 represents a parking lot which is suitably enclosed by means (not shown) to prevent the entrance of automobiles except through the controlled passageway or driveway 23 which is formed by a barrier or railing 25.

A card key pedestal 27 having a locked box or housing 30 containing a card key lock operated switch 29 (Figure 4) is disposed near the entrance and positioned within easy reach so that customers or tenants may operate the card key lock without leaving the automobile. When the switch 29 is actuated, the entrance gate 31 opens automatically.

Figure 10:
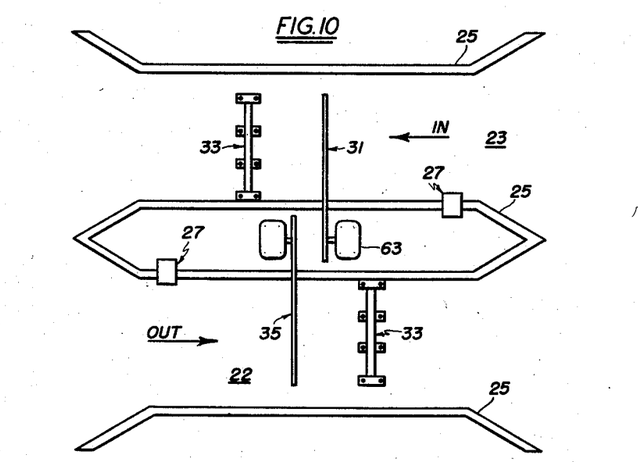
Figure 10 is a plan view of the standard parking lot control system.

As the automobile proceeds into the parking lot 21 the wheels depress a treadle 33 which automatically closes the gate 31. The same simple operation takes place when the automobile is ready to leave the premises through the exit gate 35 (Figure 10).

Figure 2:
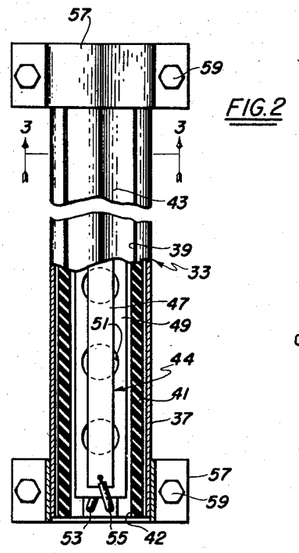
Figure 2 is a top elevation, partly in section, of the treadle.
Figure 3:
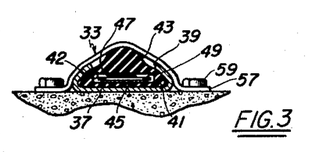
Figure 3 is a sectional view of the treadle taken substantially on the line 3—3 of Figure 2.

As shown particularly in Figures 2 and 3, the treadle 33 constitutes an elongated frame or housing 37 provided with an opening 39 along the top for receiving a strip 41 of hard extruded rubber having a projection 43 which extends through and beyond the opening 39. The strip 41 is provided with an axial, rectangular opening 42 for receiving a pressure switch 44. The switch 44 comprises an elongated lower strip 45 and an upper strip 47 with a gasket or insulation strip 49 disposed therebetween. The gasket 49 is provided with apertures 51 which permit the contact of strips 45 and 47 when the wheels of an automobile passes over the projection 43. At one end of the treadle are leads 53 and 55 which are connected to the strips 45 and 47, respectively. The treadle is secured in the passageway 23 by brackets 57 and studs or bolts 59.

As illustrated in Figures 1, 5, 6 and 7 the gate mechanism 60 is mounted on a frame 61 within a housing 63. Broadly stated the gate mechanism which is mounted on the frame 61 comprises a motor 65, reduction gear unit 67, shaft 69, and switch assembly 71. The reduction gear unit is driven by the motor 65 through a pulley 73, chain or belt 75, and pulley 77. The chain 75 is protected by a guard 79 secured to the frame 61 by a bolt 81. The reduction gear unit 67 is adapted to oscillate the shaft 69 in a cycle of approximately 90 degrees through crank arm 83, link 85 and crank arm 87.

Figure 5:
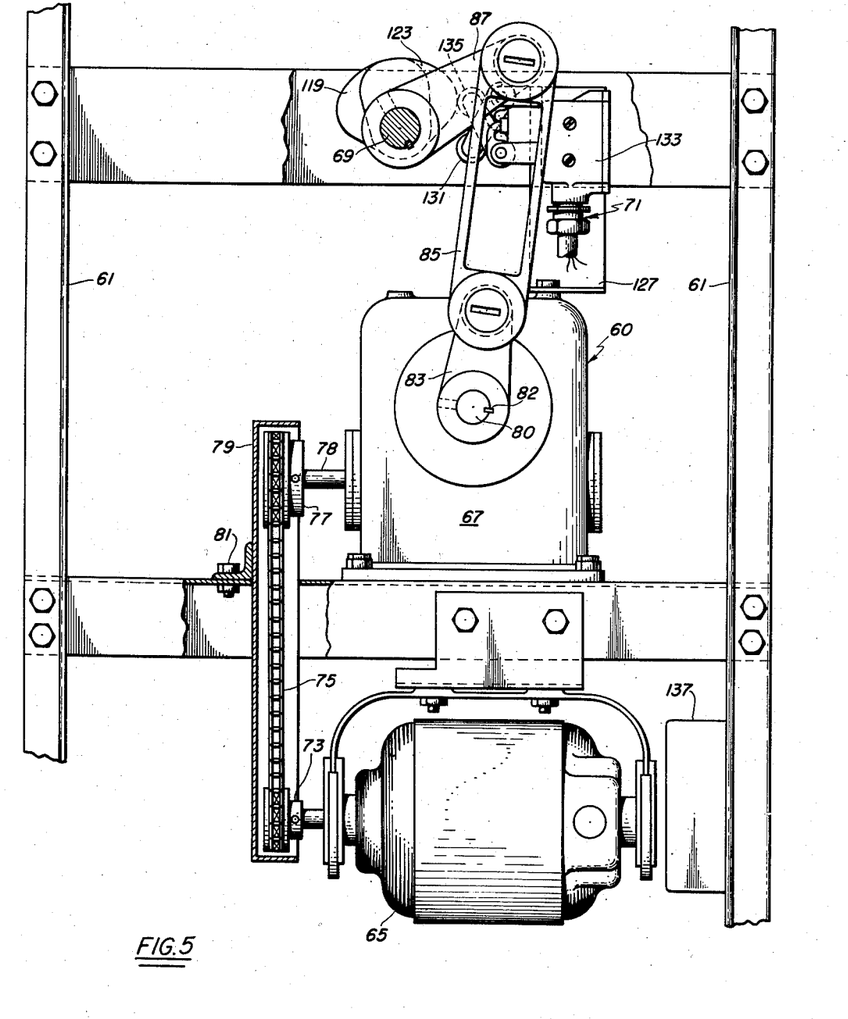
Figure 5 is a front elevation, partly in section, with parts removed, of the gate operating mechanism within the gate pedestal.
Figures 6, 7:
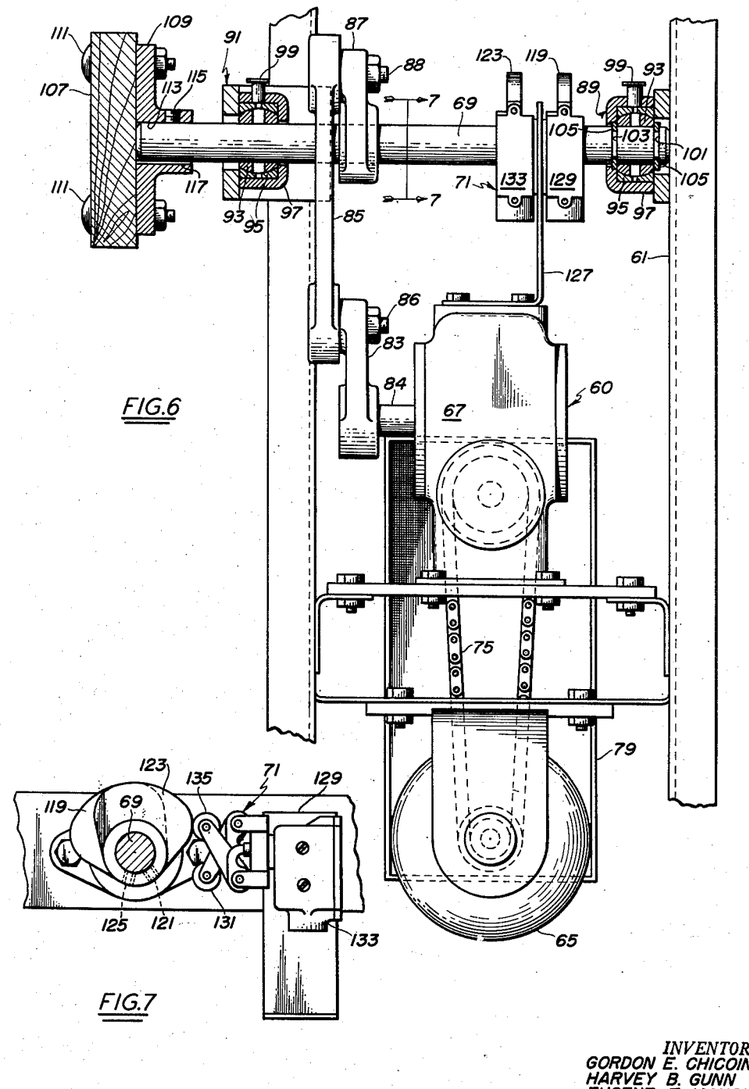
Figure 6 is a side elevation, partly in section, with parts removed, of the gate operating mechanism within the gate pedestal.
Figure 7 is a sectional view taken substantially on the line 7—7 of Figure 6 showing the limit switches and cams.

The shaft 69 is suitably supported on the frame 61 by bearings 89 and 91.

The bearings comprise a self aligning bearing member 93, race 95, housing 97 and oiler 99. The shaft is provided with slots 101 and 103 at one end for receiving retaining rings 105 which prevents axial movement of the shaft. The gate arm 107 is provided with a bracket 109 which is fastened thereto by bolts 111. The bracket is provided with a bore 113 for receiving one end of the shaft 69 and the bracket is secured to the shaft by a set screw 115 and key 117.

Referring to Figures 5 and 7 the up limit cam 119 is positioned on the shaft 69 and secured by a set screw 121. The down limit cam 123 is positioned adjacent the cam 119 and secured by a set screw 125. Mounted on top of the reduction gear unit 67 is a bracket 127 for supporting the switch assembly 71. The normally closed up limit switch 129 is mounted on one side of the bracket 127 with its actuator 131 in position to be depressed by the cam 119 to open the switch as the gate reaches approximately the open or up position. The down limit switch 133 is mounted on the other side of the bracket 127 with its actuator 135 in position to be depressed by the cam 123 at approximately zero degrees as the gate reaches the closed or down position whereby the switch changes positions as illustrated in the wiring diagram in Figure 11. It is to be understood that the limit switches may transfer or operate at a predetermined time several degrees before the gate reaches the up or down position thus allowing the gate driving mechanism and arm to coast to a rest near its vertical or horizontal position.

The case 137 for the control panel (not shown) is mounted on the frame 61.

Figure 8:
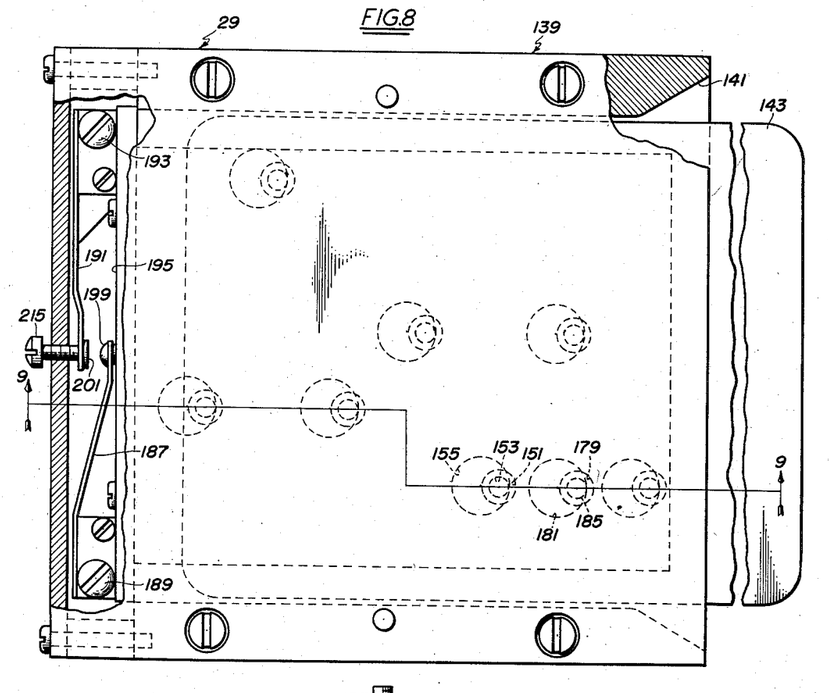
Figure 8 is a top elevation, with parts broken away, of the lock control switch mechanism and coded key.
Figure 9:
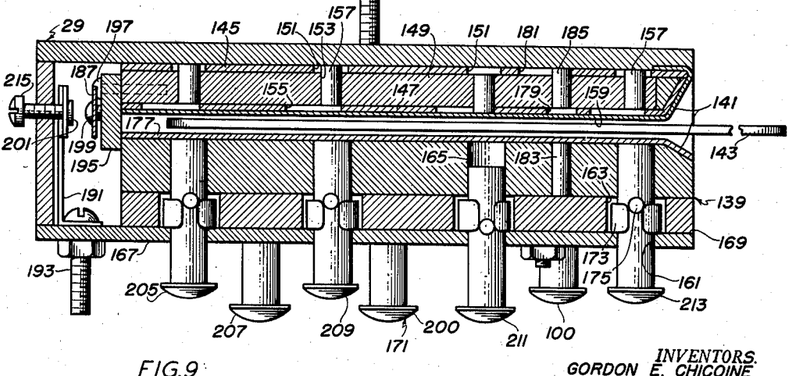
Figure 9 is a section view of the switch mechanism taken substantially on the line 9—9 of Figure 8.

Referring to Figures 8 and 9 of the drawings, the lock switch mechanism indicated by numeral 29 is substantially the same as that disclosed in Patent Number 2,648,729, filed by Maurice J. Noregaard on August 9, 1950, for a Lock Release Operated Switch. The lock switch has been modified to serve the present aplication.

The lock mechanism is normally locked in the switch open position and when a valid card key is inserted the mechanism is unlocked and the switch will be closed by sliding the card a little further into the lock.

The case or housing 139 for the switch mechanism is preferably of non-magnetic material and includes a card chute 141 which is fixed and is adapted to receive a suitable check or card key 143.

A pair of latch plates 145, 147 are mounted in parallel spaced relation above the chute and a slide plate 149 is slidably mounted between the plates.

A number of transverse bores 151, 153 and 155 are formed in a predetermined size and pattern in the latch plate 145, slide 149 and latch plate 147, respectively. The magnetic locking pins 157 are disposed for sliding movement in the bores and are of a length substantially equal to the combined thickness of plate 149 and one of the latch plates 145 or 147. A shield 159 prevents the pins from falling into the chute 141.

A number of transverse bores 161, 163 and 165 are formed in a predetermined size and pattern in the face plate 167, sub base plate 169 and housing 139 respectively. The magnetic plugs 171 extend slidably through the bores 161, 163 and 165. A non-magnetic spring clip member 173 frictionally engages the plug in the area of the bore 163. A pin 175 projects laterally from the plug for frictional engagement in the slot formed between the ends of the clip, whereby the plug may be secured releasably in retracted or projected position, for purposes described in detail hereinafter. A shield 177 prevents the plugs from entering the chute 141.

The plate 147 is provided with a small opening 179 and the plate 145 with a larger opening 181. The magnet 139 is perforated transversely to accommodate a magnet 183. It is apparent that locking pin 185 will be drawn into the smaller opening whenever a magnetic element is disposed in the card key slot in proximity with the small opening. When this occurs the rearward movement of the sliding plate 149 is restricted.

An electrical connection with the member 187 is provided by post 189 which extends through the plate 167. In similar manner, the resilient contact member 191 is secured to plate 167 with an electrical connection being provided by post 193.

The resilient contact member 187 rests against an abutment bar 195 which is secured to the rearward end of the reciprocating locking pin plate by screw 197. The abutment bar 195 projects downwardly across the rearward end of the slot formed between the shields 159, 177 for engagement by the end of card key 143. In this manner, rearward movement of a valid card key causes the plate 149 and bar 195 to move rearwardly and closes the contact points 199 and 201 of the respective electrical contact members 187 and 191.

The key employed to operate the switch described hereinbefore may comprise a card made of fibrous layers in the interior of which are placed a plurality of magnetic elements (not shown) of shim steel or the like.

In the operation of the switch of the present invention, a card key with properly patterned magnetic elements for cooperation with the arrangement of the plugs 171 is inserted in the slot 141 between the shields 159, 177. The card thus comes in contact with the abutment bar 195 at the end of the slot. As the card is pushed further in the slot, the abutment bar and plate 149 move rearwardly, bringing the electrical contact point 199 into engagement with contact point 201. The electrical circuit illustrated in Figures 11, 13, 15 and 17 is thereby completed.

The lock 29 is adapted to be used for twelve periods of any length of time by changing the code combination and card key. The code combination of the lock may be set for different periods of time as illustrated in the following table.

| Period | Buttons Pushed In | Buttons Pulled Out |
| --- | --- | --- |
| 1 | 200 | 100, 205, 207, 209, 211 and 213. |
| 2 | 200 and 205 | 100, 207, 209, 211 and 213. |
| 3 | 200 and 207 | 100, 205, 209, 211 and 213. |
| 4 | 200 and 209 | 100, 205, 207, 211 and 213. |
| 5 | 200 and 211 | 100, 205, 207, 209 and 213. |
| 6 | 200 and 213 | 100, 205, 207, 209 and 211. |
| 7 | 100 | 200, 205, 207, 209, 211 and 213. |
| 8 | 100 and 205 | 200, 207, 209, 211 and 213. |
| 9 | 100 and 207 | 200, 205, 209, 211 and 213. |
| 10 | 100 and 209 | 200, 205, 207, 211 and 213. |
| 11 | 100 and 211 | 200, 205, 207, 209 and 213. |
| 12 | 100 and 213 | 200, 205, 207, 209 and 211. |

In the event it is desired to operate the lock without any specific card code combination the screw 215 is turned in until the contacts 201, 199 almost touch each other whereby due to the slight play of the plate 149 any type of card will operate the lock.

It may also be desired to provide a grace period after the expiration of a given period. The grace period can be accomplished by arranging the next period card to operate both the expired period and the new period. Assume for example that the combination is being changed from the third period to the fourth period. The fourth period card keys are issued which will operate the lock for both the third and fourth periods. After the expiration of the grace period the third button 207 is pulled out and only the fourth period card keys will operate the lock.

Gate opening circuits

Figure 11:
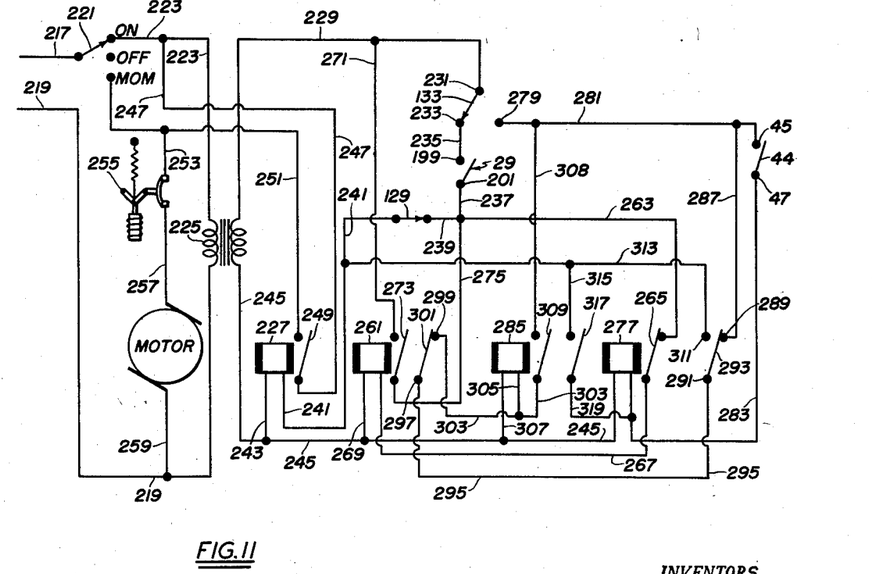
Figure 11 is a diagrammatic view of the electrical control circuits used in the system illustrated in Figure 10.

Circuit A.—Referring to Figure 11, the numerals 217 and 219 designate the power supply mains. A toggle switch 221 is connected to the main 217. When the switch 221 is moved to the "on" position current flows through line 223, the primary winding of the transformer 225 with the main 219.

*Circuit B.*—One side of the secondary winding of the transformer 225 is connected to a mercury relay 227 through line 229, contacts 231, 233 of the down limit switch 133, line 235, contacts 199, 201 of the card key switch 29, lines 237, 239, normally closed up limit switch 129 and line 241. The other side of the secondary is connected to the relay 227 through lines 243 and 245.

*Circuit C.*—One side of the motor is connected to the main 217 through switch 221, lines 223, 247, switch 249, lines 251, 253, thermal type circuit breaker 255 and line 257. The other side of the motor is connected to main 219 through line 259.

*Circuit D.*—One side of the relay 261 is connected to the secondary of the transformer 225 through line 229, contacts 231, 233, line 235, switch 29, lines 237, 263, normally closed switch 265 and line 267. The other side of the relay 261 is connected to the transformer 225 through lines 269 and 245.

*Circuit E.*—When the relay 261 is energized a holding circuit is maintained through lines 229, 271, switch 273, lines 275, 263, switch 265 and line 267. The holding circuit maintains the relay 227 energized through line 241, switch 129, lines 239, 275, switch 273 and line 271.

Gate closing circuits

*Circuit F.*—One side of the relay 277 is connected to the secondary of the transformer through line 229, contacts 231, 279, line 281, treadle switch 44 and line 283. The other side of the relay is connected to the transformer through line 245.

*Circuit G.*—The relay 285 is energized through line 229, contacts 231, 279, lines 281, 287, contacts 289, 291 of normally closed switch 293, line 295, contacts 297, 299 of normally closed switch 301 and lines 303, 305. The other side of the relay is connected to the transformer through lines 307 and 245.

*Circuit H.*—When the relay 285 becomes energized a holding circuit is maintained through line 308, switch 309 and line 305.

*Circuit I.*—When the treadle switch is again actuated by the rear wheels of an automobile the relay 277 is again energized as set forth in circuit F. The relay 277 now remains energized by a holding circuit through line 308, switch 309, line 303, switch 301, line 295, contacts 291, 311 of switch 293, lines 313, 315, switch 317 and line 319.

*Circuit J.*—Relay 227 is energized through line 308, switch 309, line 303, switch 301, line 295, contacts 291, 311 of switch 293 and lines 313, 241 whereby the motor is energized by circuit C.

Operation

Figure 4:
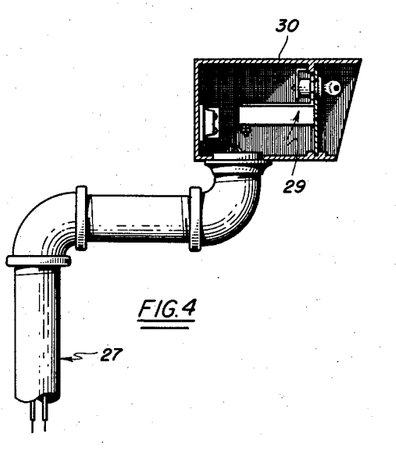
Figure 4 is a side elevation, partly in section, of the card key pedestal.

Assuming that a person having a currently valid card desires to enter the parking lot 21 which is controlled by the apparatus described above, he will first insert his card key in the lock 29 mounted in the pedestal 27 (Figure 4). The slide 149 will be released and further pressure on the card will close the contacts 199, 201 to energize circuits B to E.

The motor actuates the gate mechanism 60 to open the gate 31. As the gate starts to open the cam operated switch 133 changes positions from contacts 231, 233, to contacts 231, 279.

When the gate arm 31 reaches approximately 90 degrees the cam 119 opens switch 129 deenergizing relay 227 whereby the motor is stopped. Relay 261 remains energized.

As the front wheels of the automobile pass over the treadle 33, contacts 45 and 47 are closed energizing circuits F to H. Relay 261 becomes deenergized and relay 285 remains energized through circuit H.

When the rear wheels of the automobile pass over the treadle 33 the relay 277 again becomes energized as set forth in circuit F and remains energized through holding circuit I. Relay 227 becomes energized through circuit J closing switch 249 which starts the motor to operate the mechanism 60 thus closing the gate 35.

As the gate arm begins to close the up limit switch returns to the normally closed position. The down limit switch 133 changes from contacts 231, 279 to contacts 231, 233 at approximately zero degrees whereby the relays 277, 285 and 227 become deenergized and the motor is stopped. The operation of the exit gate 35 is substantially the same as the entrance gate.

Figure 12:
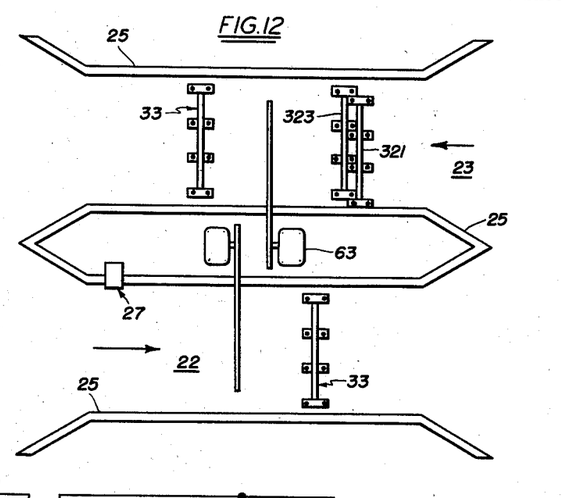
Figure 12 is a plan view of the parking lot control system having a free entrance or exit.
Figure 13:
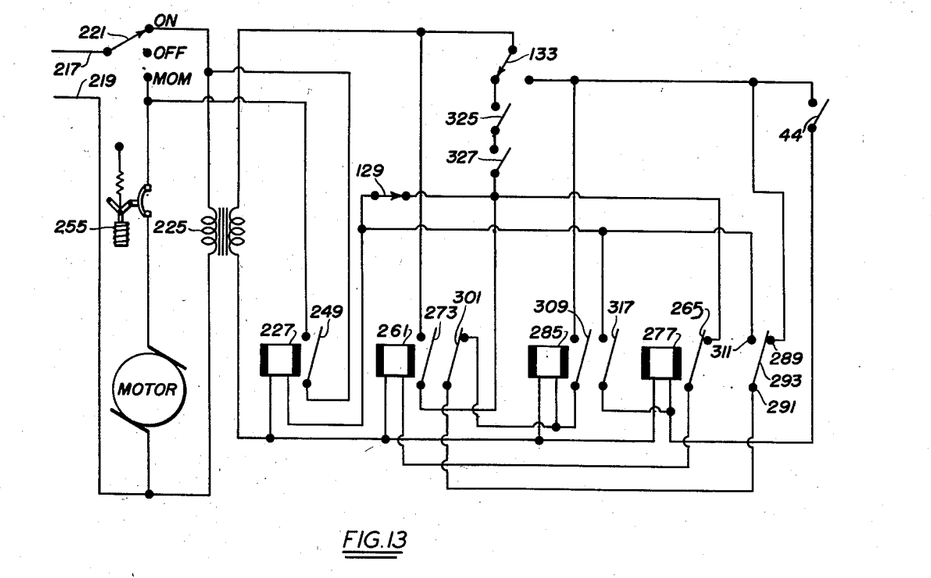
Figure 13 is a diagrammatic view of the electrical control circuits used in the system illustrated in Figure 12.

The difference between the control systems illustrated in Figure 10 and Figure 12 is primarily a modification of the entrance or exit. In some cases it is desirable to provide a free entrance or a free exit to the parking lot. This is accomplished by substituting two treadles 321, 323 having the same construction as treadle 33 for one of the card key pedestals 27. The wiring diagram illustrated in Figure 13 is substantially the same as the diagram illustrated in Figure 11 with the exception that treadle switches 325, 327 of the treadles 321, 323, respectively are connected in series and are substituted for one of the switches 29. The card key side operates in the same manner as the standard system illustrated in Figures 10 and 11.

The operation of the free entrance or free exit system is substantially the same as the standard system illustrated in Figure 12 except that on the free side the weight of the front wheel of the automobile closes the treadle switches 325, 327 to energize the circuits B to E which starts the motor to open the gate. The two treadles 321, 323 are rigidly constructed to prevent the operation of the gate by the weight of a human being.

Figure 14:
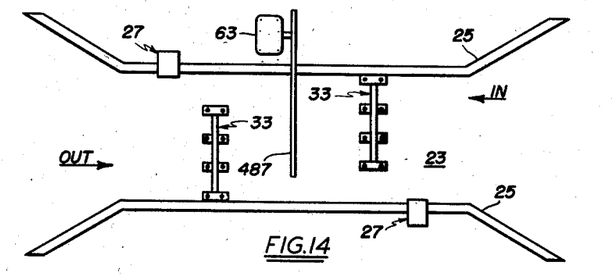
Figure 14 is a plan view of the parking lot control system having a dual control gate.
Figure 15:
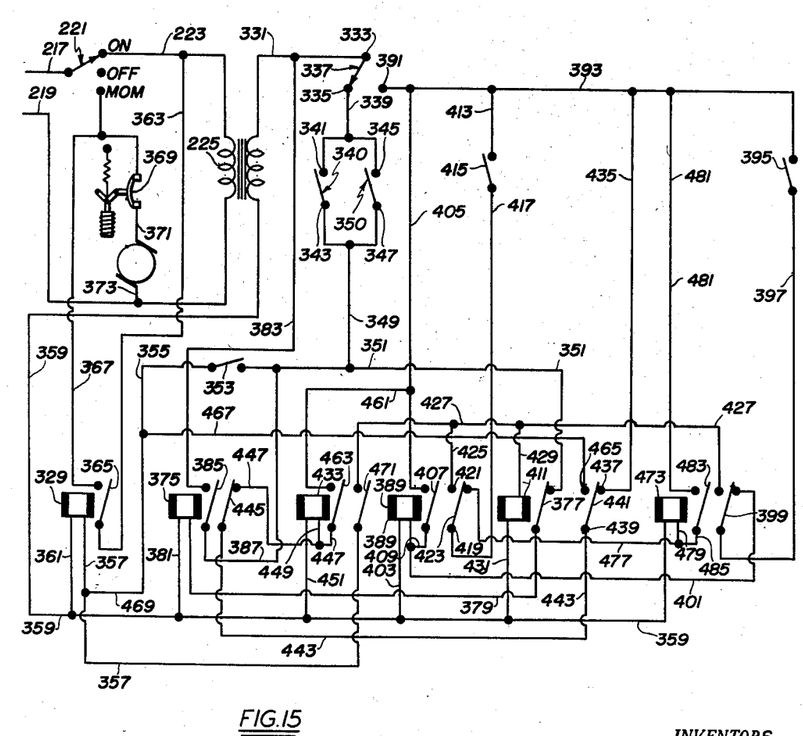
Figure 15 is a diagrammatic view of the electrical control circuits used in the system illustrated in Figure 14.

The modification illustrated in Figures 14 and 15 is primarily different from the systems shown in Figures 10 and 12 in that the passageway 23 is controlled by a two-way gate for use on a small parking lot.

The dual control of the gate mechanism 60 can be accomplished by the following circuits.

Gate opening circuits

Referring to Figure 15, the power supply to the transformer 225 is the same as circuit A.

*Circuit K.*—One side of the secondary winding of the transformer 225 is connected to a mercury relay 329 through line 331, contacts 333, 335 of the down limit switch 337, line 339, either contacts 341, 343 of card key switch 340 or contacts 345, 347 of card key switch 350, lines 349, 351, normally closed up limit switch 353 and lines 355, 469 and 357. The other side of the secondary is connected to the relay 329 through lines 359 and 361.

*Circuit L.*—One side of the motor is connected to the main 217 through switch 221, lines 223, 363, switch 365, line 367, thermal type circuit breaker 369 and line 371. The other side of the motor is connected to main 219 through line 373.

*Circuit M.*—One side of the relay 375 is connected to the secondary of the transformer 225 through line 331, contacts 333, 335 of switch 337, line 339, switch 340 or 350, lines 349, 351, normally closed switch 377 and line 350, lines 349, 351, normally closed switch 377 and line transformer through lines 381 and 359.

*Circuit N.*—When the relay 375 is energized a holding circuit is maintained through line 383, switch 385, lines 387, 351, switch 377 and line 379. The holding circuit maintains the relay 329 energized through line 383, switch 385, lines 387, 351, normally closed switch 353 and lines 355, 469, 357.

Gate closing circuits

*Circuit O.*—One side of the relay 389 is connected to the secondary of the transformer 225 through line 331, contacts 333, 391, line 393, treadle switch 395, line 397, normally closed switch 399 and line 401. The other side of the relay 389 is connected to the transformer through lines 403 and 359.

*Circuit P.*—When the relay 389 is energized a holding circuit is maintained through line 405, switch 407 and line 409. The relay 411 is, also, connected to be energized through line 331, contacts 333, 391 of switch 337, lines 393, 413, treadle switch 415, line 417, contacts 419, 421 of switch 423 and lines 425, 427, 429. The other side of the relay 411 is connected to the transformer through lines 431 and 359.

Circuit Q.—One side of the relay 433 is connected to the transformer 225 through line 331, contacts 333, 391 of switch 337, lines 393, 435, contacts 437, 439 of switch 441, line 443, switch 445 and lines 447, 449. The other side of the relay 433 is connected to the transformer through lines 451 and 359. When the relay 433 is energized a holding circuit is maintained through lines 405, 461, switch 463 and lines 447, 449.

Circuit R.—When the treadle switch 415 is again actuated by the rear wheels of an automobile the relay 411 is again energized as set forth in circuit P. The relay 411 now remains energized by a holding circuit through lines 405, 461, switch 463, line 447, switch 445, line 443, contacts 439, 465 of switch 441, lines 467, 469, 357, switch 471 and lines 427, 429. The relay 329 is, also, energized through lines 405, 461, switch 463, line 447, switch 445, line 443, contacts 439, 465 of switch 441 and lines 467, 469, 357 whereby the motor is energized by circuit L.

Circuit S.—When the treadle switch 415 is actuated before the treadle switch 395 the relay 473 is energized through line 331, contacts 333, 391 of switch 337, lines 393, 413, treadle switch 415, line 417, contacts 419, 475 of switch 423 and lines 477, 479. The other side of the relay 473 is connected to the transformer through line 359.

Circuit T.—When the relay 473 is energized a holding circuit is maintained through line 481, switch 483 and lines 485, 479.

*Operation*

As indicated above, the modification serves as a two-way gate for control of the passageway 23.

As a person traveling in inserts a currently valid card in the switch 350 mounted in a pedestal 27 circuits K, L, M and N are energized to open the gate. As the gate starts to open the cam operated switch 337 changes positions from contacts 333, 335, to contacts 333, 391. When the gate arm 488 reaches approximately 90 degrees the cam 119 opens switch 353 deenergizing relay 329 whereby the motor is stopped. The relay 375 remains energized.

As the rear wheels of the automobile pass over treadle 33 the switch 395 closes thus energizing circuits O and P. The relay 389 remains energized through circuit P.

As the front wheels of the automobile pass over the other treadle 33 the switch 415 closes thus energizing circuit Q and again energizing circuit P. Relay 375 becomes deenergized and relay 433 remains energized through the holding circuit.

When the rear wheels pass over the treadle 33 the switch 415 again closes thus energizing circuit R which starts the motor to operate the mechanism 60 for closing the gate.

As the gate arm begins to close the cam operated up limit switch 353 returns to the normally closed position. The cam operated down limit switch 337 changes from contacts 333, 391 to contacts 333, 335 at approximately zero degrees whereby the relays 411, 433, 389 and 329 become deenergized and the motor is stopped.

When a person traveling out inserts a valid card in the switch 340 mounted in a pedestal 27 the gate is opened as previously described. The treadle switch 415 is operated first and circuits S and T are energized. The closing operation is then the same as explained above.

Figure 16:
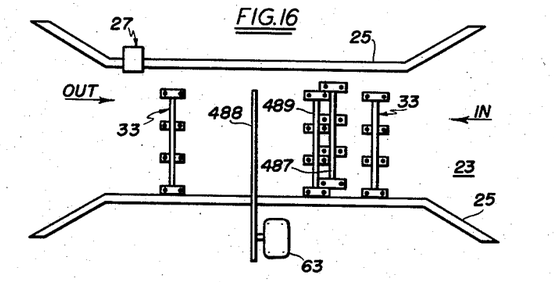
Figure 16 is a plan view of the parking lot control system having a dual control gate with a free entrance or exit.
Figure 17:
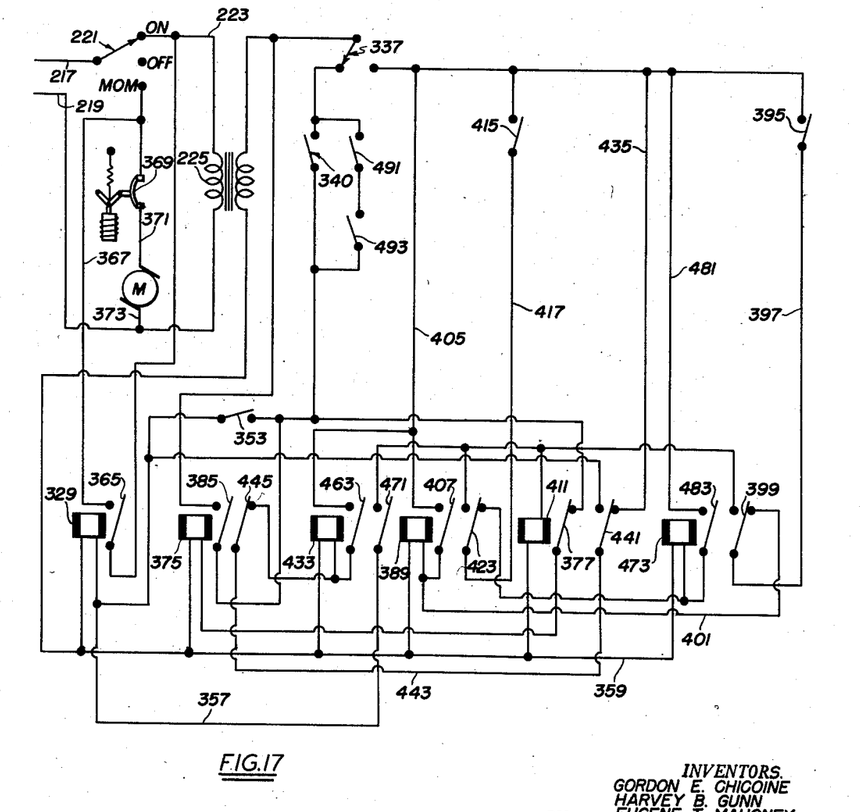
Figure 17 is a diagrammatic view of the electrical control circuits used in the system illustrated in Figure 16.

The difference between the control systems illustrated in Figures 16 and 14 is primarily a modification of the entrance or exit. In some cases it is desirable to provide a free entrance or a free exit to the parking lot. This is accomplished by substituting two treadles 487, 489 having the same construction as treadle 33 for one of the card key pedestals 27. The wiring diagram illustrated in Figure 17 is substantially the same as the diagram illustrated in Figure 15 with the exception that treadle switches 491, 493 of the treadles 489, 459, respectively are connected in series and are substituted for the switch 350. The card key side operates in the same manner as the system illustrated in Figure 15.

The operation of the free entrance or free exit system is substantially the same as the dual control system illustrated in Figure 15 except that on the free side the weight of the front wheel of the automobile closes the treadle switches 491, 493 to energize the circuits K, L, M and N which starts the motor to open the gate.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

We claim:

1. In a control apparatus for a parking lot provided with a passageway for vehicles, in combination, a gate, means mounting the gate for movement to and from a position obstructing the passageway, power means including a motor for moving the gate, an electromagnet lock having means including a switch connected in a first circuit for actuating the power means to open the gate upon the insertion of a valid check, an up limit switch disposed in said first circuit, means for operating said up limit switch at predetermined positions of the gate, means operable thereafter including a treadle having a switch connected in a second circuit for actuating the power means to close the gate, a down limit switch disposed in said second circuit and means for operating the down limit switch at predetermined positions of the gate.

2. In a control system for a parking lot provided with a passageway for automobiles, in combination, a gate, means mounting the gate for movement to and from a position obstructing the passageway, power means including a motor for moving the gate, a first pedestal disposed outside the gate, a first lock disposed in said first pedestal and having means including a switch connected in a first circuit for actuating the power means to open the gate upon the insertion of a valid check, means operable thereafter including a first treadle disposed inside said gate and having a switch connected in a second circuit for actuating the power means to close the gate, means for deenergizing the power means when the gate reaches predetermined positions, a second pedestal disposed inside the gate, a second lock disposed in said second pedestal and having means including a switch connected in parallel in said first circuit for actuating the power means to open the gate upon the insertion of a valid check and means operable thereafter including a second treadle disposed outside said gate and having a switch connected in a third circuit for actuating the power means to close the gate.

3. In a control system for a parking lot provided with a first and second passageway for automobiles, in combination, a first gate, a second gate, means mounting the gates for movement to and from a position obstructing the passageways, a first motor, a first motor circuit means connecting the first motor for controlling the operation of the first gate, a first control pedestal disposed outside the first gate, a first lock means mounted in the first pedestal and including a switch connected in a first circuit for energizing the first motor circuit to open the first gate, a normally closed up limit switch connected in said first circuit, means for operating said limit switch at a predetermined position of the gate to disable the first circuit and thereby said first motor circuit, means operable thereafter including a first treadle disposed inside the gate and having a switch connected in a second circuit for energizing the first motor circuit to close the first gate, a normally closed down limit switch connected in the first and second circuits and means for operating the down limit switch at predetermined positions of the first gate, a second motor, a second motor circuit means connecting the second motor for controlling the operation of the second gate, a second control pedestal disposed inside the second gate, a second lock means mounted in the second pedestal and including a switch connected in a third circuit for energizing the second motor circuit to open the second gate, a normally closed up limit switch connected in said third circuit, means for operating said limit switch at a predetermined position of the gate to disable the third circuit and thereby said second motor circuit, means operable thereafter including a second treadle disposed outside the second gate and having a switch connected in a fourth circuit for energizing the second motor circuit to close the second gate, a normally closed down limit switch connected in the third and fourth circuits and means for operating the down limit switch at predetermined positions of the second gate.

4. In a control system for a parking lot provided with a passageway for automobiles, in combination, a gate, means mounting the gate for movement to and from a position obstructing the passageway, a motor, means including a motor circuit for controlling the operation of the gate, lock means including a switch connected in a first circuit and responsive to the insertion of a valid check for closing said switch to energize the motor circuit, means for disabling the first circuit and thereby said motor circuit when the gate reaches a predetermined open position, means operable thereafter including a treadle having a switch connected in a second circuit, and responsive to the first operation of the treadle for closing a third circuit to condition the motor circuit for energization, a fourth circuit responsive to the second operation of the treadle for energizing the motor circuit to close the gate and means for disabling the second circuit and thereby said motor circuit when the gate reaches a predetermined closed position.

5. A control means for a parking lot gate comprising a gate, a first power means operatively connected to said gate for moving the same in one direction, a lock switch disposed on one side of said gate, said lock switch being operatively associated with said power means to energize same to move said gate in said one direction upon actuation of said lock switch, a second power means operatively connected to said gate for moving the same in a direction opposite to said one direction, a vehicle actuated switch located on the opposite side of said gate from said lock switch, said vehicle actuated switch being connected to said second power means to energize same upon passage of the rear wheels of the vehicle thereover to move said gate in said opposite direction when said switch is actuated, said vehicle actuated switch being selectively positioned in a region defined by said gate and a location spaced from said gate a distance approximately the same as the rear overhang of the larger conventional automotive vehicles.

6. The combination in accordance with claim 5, wherein said lock switch comprises a card key control switch having means responsive to insertion of a vehicle card for actuating said lock switch.

7. The combination in accordance with claim 5, wherein said card switch comprises an electric switch having means responsive to insertion of a valid check for actuating said electric switch.

8. The combination in accordance with claim 5, wherein said second power means comprises means responsive only to dual actuation of said vehicle actuated switch to energize said second power means.

9. The combination in accordance with claim 5, wherein said second power means comprises means responsive only to dual actuation of said vehicle actuated switch to energize said second power means, wherein said lock switch comprises a card key control switch having means responsive to insertion of a valid card for actuating said lock switch.

10. The combination in accordance with claim 5, further comprising limit switch means operatively associated with said power means to limit the extent of movement of said gate in both of said directions.

11. The combination in accordance with claim 5, further comprising a second gate, a third power means operatively connected to said gate to move same in a first direction, a second lock switch disposed on one side of said second gate and operatively associated with said third power means to energize same, a fourth power means operatively connected to said second gate for moving same in a direction opposite to said first direction, a second vehicle operated switch on the opposite side of said second gate from said second lock switch, said second vehicle actuated switch being connected to said fourth power means to energize same and means for positioning said first mentioned gate to obstruct the entrance to the parking lot and said second gate means to obstruct the exit from the parking lot.

12. The combination in accordance with claim 11, wherein each of said lock switches comprises a card key control switch having means responsive to insertion of a valid card for actuating said lock switch.

13. The combination in accordance with claim 11, wherein said second and fourth power means comprise means responsive only to dual actuations of their associated vehicle actuated switches to energize their respective power means.

14. The combination in accordance with claim 11, wherein each of said lock switches comprises a card key control switch having means responsive to insertion of a valid card for actuating said lock switch, and wherein said second and fourth power means comprise means responsive only to dual actuations of their associated vehicle actuated switches to energize their respective power means.

15. The combination in accordance with claim 11, wherein at least one of said lock switches comprises plural vehicle actuated treadle switches.

16. The combination in accordance with claim 5, wherein said lock switch comprises plural vehicle actuated treadle switches.

References Cited in the file of this patent
UNITED STATES PATENTS

| | | |
|---|---|---|
| 2,073,834 | Duany et al. | Mar. 16, 1937 |
| 2,094,216 | Hunter | Sept. 28, 1937 |
| 2,528,790 | Scherer | Nov. 7, 1950 |
| 2,735,202 | King | Feb. 21, 1956 |

UNITED STATES PATENT OFFICE

CERTIFICATE OF CORRECTION

Patent No. 2,842,876   July 15, 1958

Gordon E. Chicoine et al.

It is hereby certified that error appears in the printed specification of the above numbered patent requiring correction and that the said Letters Patent should read as corrected below.

Column 3, line 40, for "aplication" read -- application --; line 73, for "magnet" read -- housing --; column 6, line 60, strike out "350, lines 349, 351, normally closed switch 377 and line" and insert instead -- 379. The other side of the relay 375 is connected to the --.

Signed and sealed this 4th day of November 1958.

(SEAL)
Attest:

KARL H. AXLINE
Attesting Officer

ROBERT C. WATSON
Commissioner of Patents